C. JONES.
REVOLVING HAY RACK.
APPLICATION FILED JUNE 2, 1917.
1,261,241.
Patented Apr. 2, 1918.
3 SHEETS—SHEET 1.
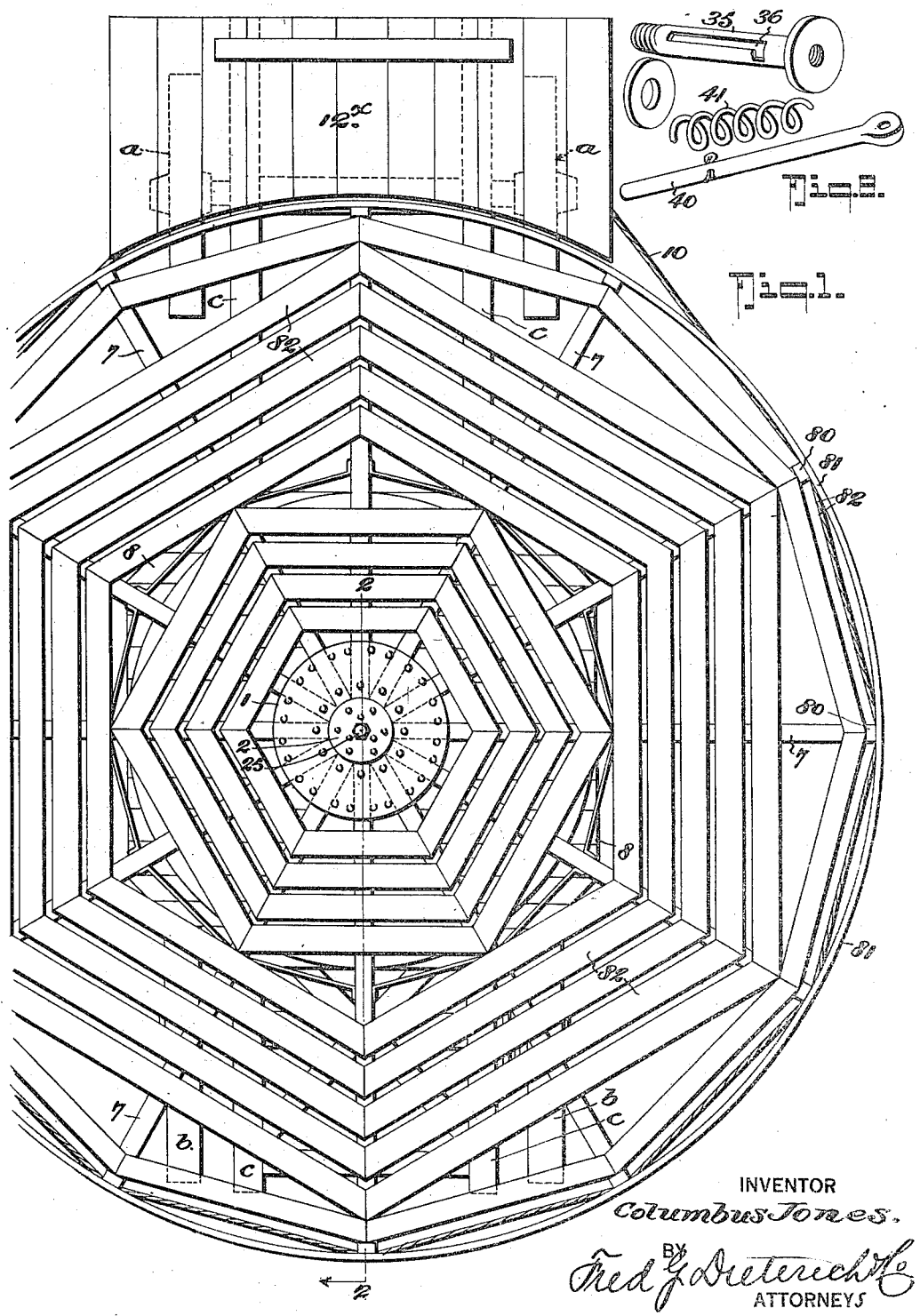
INVENTOR
Columbus Jones.
BY
Fred G. Dieterich
ATTORNEYS

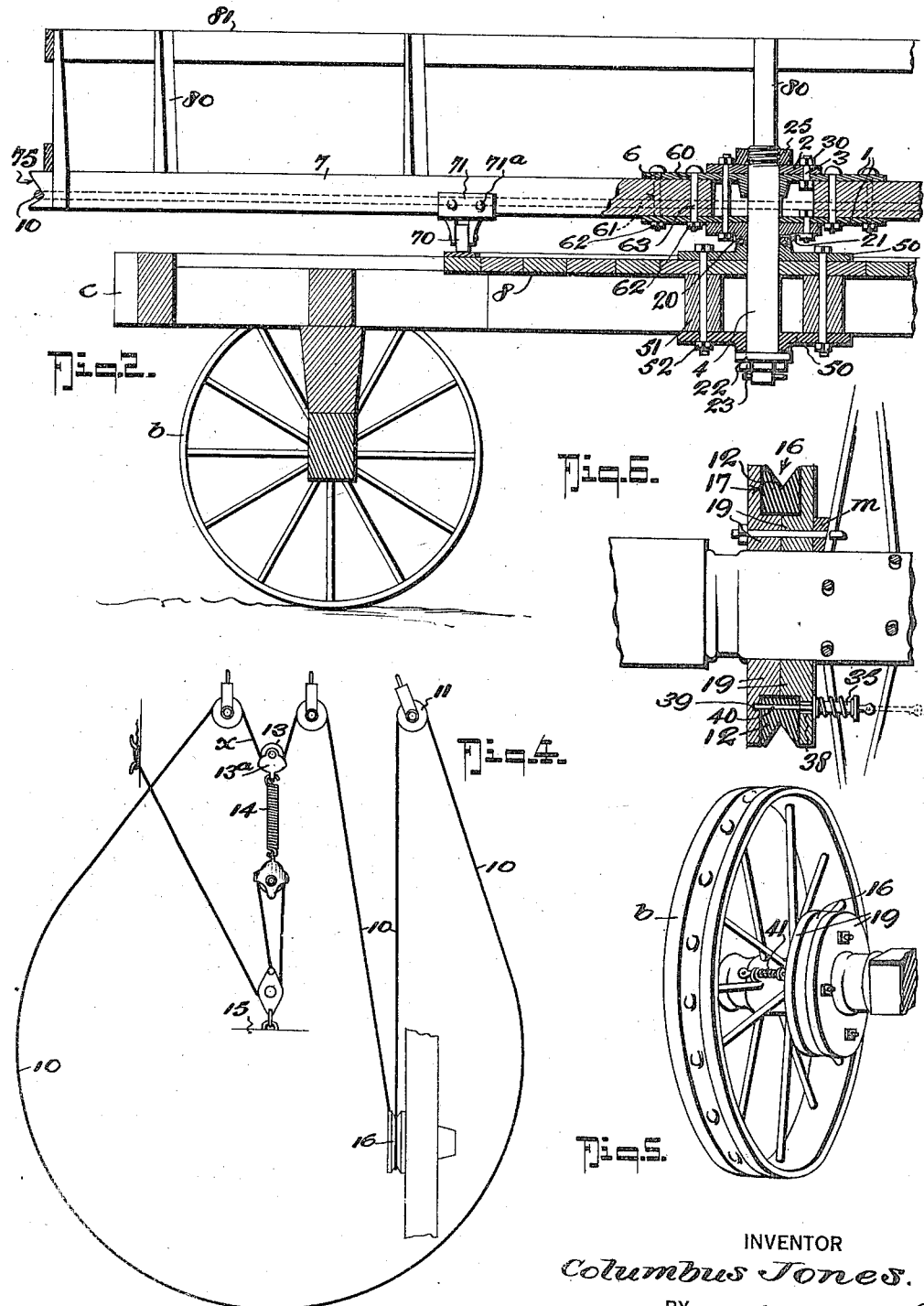

C. JONES.
REVOLVING HAY RACK.
APPLICATION FILED JUNE 2, 1917.
1,261,241.
Patented Apr. 2, 1918.
3 SHEETS—SHEET 3.
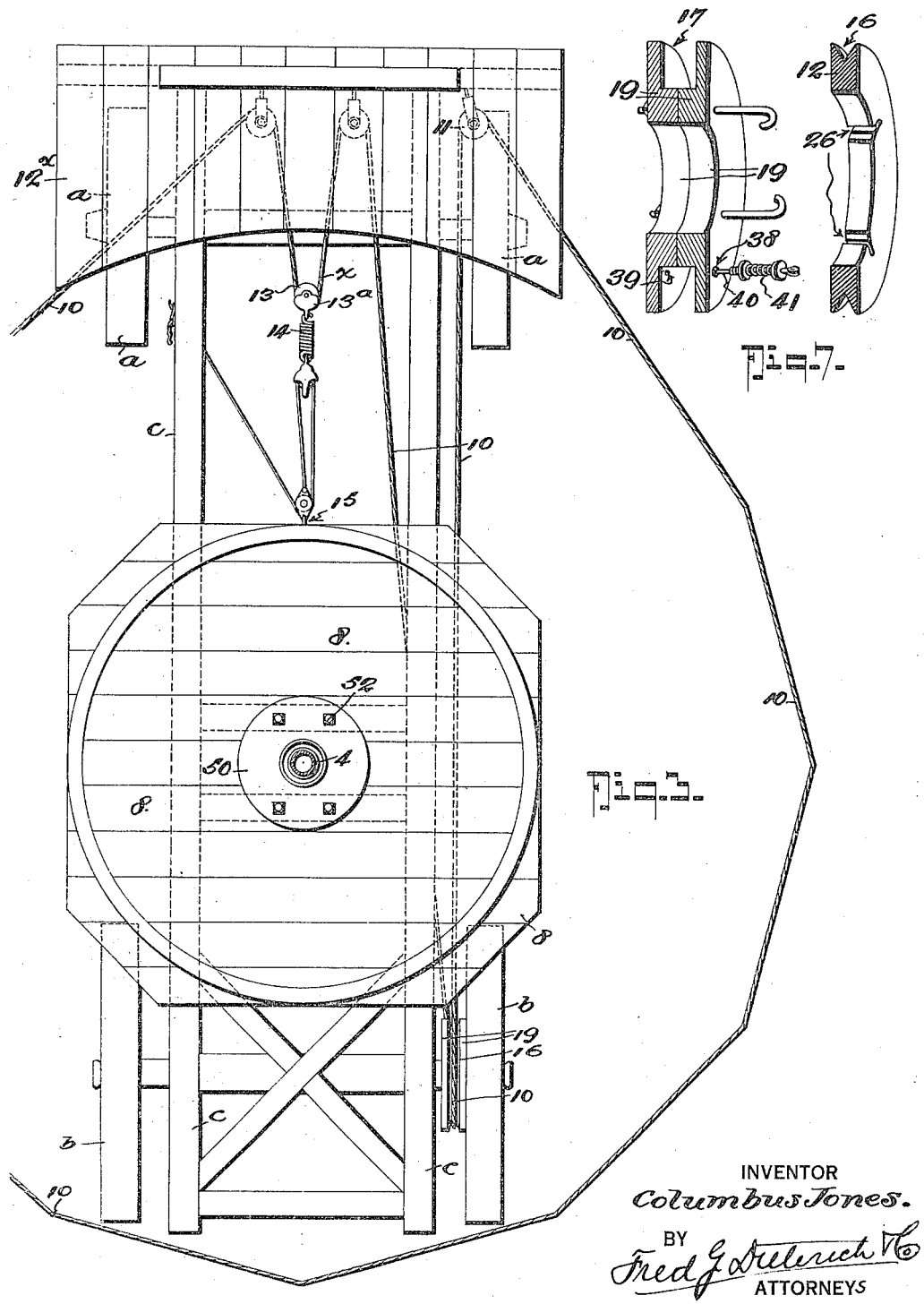
INVENTOR
Columbus Jones.
BY
Fred G. Dieterich
ATTORNEYS

UNITED STATES PATENT OFFICE.

COLUMBUS JONES, OF WASHINGTON, KANSAS.

REVOLVING HAY-RACK.

1,261,241.   Specification of Letters Patent.   Patented Apr. 2, 1918.

Application filed June 2, 1917. Serial No. 172,434.

*To all whom it may concern:*

Be it known that I, COLUMBUS JONES, a citizen of the United States, residing at Washington, in the county of Washington and State of Kansas, have invented new and useful Improvements in Revolving Hay-Racks, of which the following is a specification.

This invention has reference to improvements in revolving racks that are more particularly designed for being used in connection with hay loaders and my said invention has special reference to improvements on the construction of revolving hay racks disclosed in my copending allowed application, Serial No. 119,187, filed September 9, 1916.

Primarily, my present invention seeks to provide a simplified arrangement of the rack devices shown in my said copending application and a simple and inexpensive rope drive mechanism coöperative with the revolving rack and the wagon truck upon which the said rack is mounted.

Another object of my invention is the provision of an improved means for clutching the rope drive mechanism with one of the wheels of the vehicle and adapted for being readily adjusted for its operative and inoperative conditions.

With other objects in view that will be hereinafter referred to, my present invention embodies the peculiar features of construction and combination of parts to be first described in detail, specifically pointed out in the appended claims and illustrated in the accompanying drawings, in which:

Figure 1 is a top plan view of my improved construction of hay rack, the same being shown as operatively applied to a wagon truck.

Fig. 2 is a longitudinal section thereof, on the line 2—2 on Fig. 1.

Fig. 3 is a plan view of my invention, the revolving rack being removed.

Fig. 4 is a diagrammatic plan view that illustrates the rope drive mechanism, including the tension devices for holding the rope drive taut.

Fig. 5 is a detail perspective view of the rear wagon wheel equipped with my improved rope drive pulley and the clutch mechanism for adjusting the said pulley into and out of operative condition.

Fig. 6 is a vertical cross section of the said wheel and shows the parts thereof adjusted for placing the rope drive into action, the locking pin being shown out of engagement in dotted lines.

Fig. 7 is a perspective view, parts being in section of the driver wheel hub, the cable pulley and the coöperating clutch devices, the several parts being shown as separated to the better illustrate their correlative arrangement.

Fig. 8 is a detail view of the clutch pin and the means for holding it out of its operative or clutch position.

In the construction of revolving hay racks disclosed in my copending application, I provide a driving or power transmission, coöperative with one of the rear wheels of the wagon truck and the rack head and the said mechanism includes a shiftable worm shaft that is normally held out of active condition and which, when it is desired to impart rotary motion to the rack head, is manually moved into operative connection with the rack head actuating gear.

This means for imparting rotation to the rack head I have found more or less expensive and not fully meeting the desired requirement.

In my present construction of revolving rack I dispense with the use of the aforesaid gear transmission and in place thereof I employ an improved arrangement of rope drive that passes around the outer ends of the arms that radiate from the rack head, and transmission devices coöperative with the said rope drive and one of the rear wheels of the wagon truck and which includes a simple, easily adjusted and effective means for shifting the said power transmission whereby to place it in or out of operative condition, as required.

In my present construction of revolving rack, the wagon truck comprises the front wheels $a$—$a$, the rear wheels $b$—$b$ and the longitudinal timbers $c$—$c$ arranged substantially the same as the like parts appear in my copending application before referred to.

Referring now more particularly to Fig. 2 of the drawings, it will be seen that the head portion of my improved rack includes a pair of steel disks or plates 1—1 that are held spaced apart by a pair of spider or hub-like disks 2—2, one of which rests on the top of the upper plate or disk 1 and the other is held up against the under side of the lower plate or disk 1, and the said hub disks 2—2 are secured to the respective upper and lower plates 1—1 by short bolts 3—3 that pass through the disks and the plates and are secured by clamp nuts 30—30, as shown.

The hub portion of the rotary head is mounted on the upper end of a vertical shaft 4 that is journaled in upper and lower head plates 50—50 secured to the wagon frame timbers 51 by bolts 52—52, as is clearly shown in Fig. 2.

20 designates a collar on the lower hub disk and 21 a set screw that engages the collar and the shaft 4 to cause the said shaft to turn in its bearings or plates 50—50.

22 designates a washer that is held up against the lower plate 50, 23 a clamp nut that engages the lower screw threaded end of the said shaft 4 and is held from screwing off the shaft by a cotter pin that engages the shaft and 25 designates a clamping nut on the upper end of the shaft 4 that engages the upper hub plate or disk 1, as shown.

By referring now to Figs. 1, 2 and 3, it will be seen the upper and lower disks 1—1 have a series or sets of alining bolt apertures, and each set consists of pairs 6—6 located at the peripheral edge of the disks and single ones 60—60 located near the hub plates 2—2.

7—7 designate the radial arms of my revolving rack, the inner ends of which are securely clamped between the upper and lower steel disks 1—1, each of the said arms having the inner end passed between a pair of bolt apertures 6—6 and between the bolts 61—61 that pass through the said aperture 6—6 and are secured by their attached nuts 62—62, and the inner end of each arm has a single bolt aperture for receiving a clamp bolt 63 that passes through the single apertures 60—60 and is secured by its clamp nut 65.

The platform 8 in my present invention, is supported on the upper head plate 50 and the truck timber c—c and upon the said platform is mounted an annular metal trackway upon which the caster-like roller bearings 70, attached to the lower sides of the radial arms 7, travel.

71 denotes strap iron brackets that have angled portions for receiving the bolts 71ª that secure the said brackets between the edges of the arms 7, as shown.

10 designates an endless rope drive which passes over guide grooves 75 in the outer ends of the radial arms 7—7, and over a guide pulley 11 at the side of the front or driver's platform 12ˣ.

From the pulley 11, the rope or cable drive passes back at the side of the truck frame, around a rope sheave 12 driven from one of the rear wheels b of the wagon truck in the manner to be presently explained and from the said sheave 12, the loop end x of the endless rope drive passes over a guide pulley 13 journaled in a slack take-up device that includes a head piece 13ª, a tension spring 14 and a flexible connection that joins the tension spring with a fixed part 15 of the machine, as is best shown in Fig. 4.

By providing a slack take-up for the endless drive cable, as stated and shown, the cable or rope is at all times held in proper frictional contact with the radial arms of the revolving head, it being obvious that so long as a pull strain is on the rope, the rack head will be revolved.

For controlling the power transmission from the rear drive wheel and the rope drive, I provide the clutch mechanism shown in Figs. 5, 6, 7 and 8 in which 12 designates the rope or cable sheave provided with a deep groove 16 with which the cable or rope drive engages.

The sheave 12 is in the nature of a ring that fits an annular seat groove 17 formed between the shoulder or off set peripheral ends of a pair of opposing hub rings 19—19 that are attached to the spokes of the wheel b by clip hooks 25—25 in the manner best shown in Fig. 6.

The rope sheave 12 has its internal face formed with a plurality of spaced transverse notches 26—26, the purpose of which will be presently explained.

35 designates a tubular member formed along one edge with a bayonet slot 36 and having one end threaded for screwing into a threaded cross aperture 38 in one of the hub rings 19 that register with a like aperture 39 in the opposing ring 19.

40 designates a plunger or lock pin slidable in the tubular member 35 and normally held to its plunging or clutching position by a coil spring 41 and the said pin is of such length relatively to the member 35, the ring shape rope sheave 12 and the opposing rings 19—19, that when at the operative position, the inner end of the pin, when turned to its clutching position, tends to plunge across the groove seat formed by the two opposing rings 19—19 and in position for being snapped into engagement with either of the cross notches 26, when the sheave 12 is turned to the operative or clutching position.

To unclutch the sheave 12, that it may run free with respect to the hub of the driver wheel on which the hub devices are mounted, it is only necessary to pull the plunger pin 40 back out of engagement with the sheave 12 until the cotter pin comes into line with the side or lateral portion of the key hole slot, as is shown in Fig. 9, when by giving the pin a slight turn, the cotter pin will engage the lateral portion of the key hole slot.

While I have not shown it, it is obvious that in practice connection operable from the driver's seat may be employed for shifting the plunger pin forward.

The clutch device is held to the wagon wheel at proper distance from the plane of the inner face of the wheel by spacing blocks m on the spoke clips, as shown.

In the drawings, I have shown the radial arms provided with attached verticle standards 80 connected by circular looplike guards 81—81 that form a side closure for the slatted bottom 82—82 secured upon the said radial arms.

From the foregoing description taken in connection with the drawings, the complete construction, the manner of operation and the advantages of my invention will be readily apparent to those skilled in the art to which my said invention relates.

By reason of mounting the revolving rack in the manner shown and described, the operation of loading onto the rack is easily effected, since the radial arms can be brought around to receive the load thereon, as conditions may require, it being understood that the rack will be geared up with the rope drive so long as the plunger or clutch pin 40 holds the rope drive pulley 12 clutched to the driver wheel, it being also understood so soon as the said pulley 12 is released, the rope drive is thrown out of operative condition.

By reason of making the rack head, as shown and described, a stronger, simpler and more flexible revolving rack head structure is provided and one that will readily allow for any torque of the wagon frame, further by applying the rope drive to the circumference of the rack frame, a more economical and easier driving means is provided over the drive mechanism shown and described in my allowed application before referred to.

While the arrangement of the parts as illustrated and described disclose a practical assemblage of elements that constitute my present form of revolving hay rack, I desire it understood that the said parts may be readily varied or modified without departing from my invention as comes within the scope of the appended claims.

What I claim is:

1. The combination with a wheeled truck frame that includes longitudinal timbers and transverse bars; of a revolving rack mechanism that includes a vertically disposed rotary shaft, bearings therefor mounted on the said frame, a platform, the said rack mechanism also including a head, arms attached to and radially projected from the head, a bottom mounted on the arms, an annular vertical frame mounted on the said arms, and a power transmission for imparting rotary motion to the head, said transmission including an endless cable or rope drive that takes around the outer ends of the radial arms, a driven pulley on one of the rear wheels of the truck and guides upon the said truck over which the said endless rope drive passes, said drive engaging the driving pulley on the rear wheel as stated.

2. The combination with a wheeled truck frame that includes longitudinal timbers and transverse bars; of a revolving rack mechanism that includes a vertically disposed rotary shaft, bearings therefor mounted on the said frame, a platform, the said rack mechanism also including a head, arms attached to and radially projected from the head, a bottom mounted on the arms, an annular vertical frame mounted on the said arms, and the power transmission for imparting rotary motion to the head, said transmission including an endless cable or rope drive that takes around the outer ends of the radial arms, a driven pulley on one of the rear wheels of the truck and guides upon the said truck over which the said endless rope drive passes, said drive engaging the driving pulley on the rear wheel as stated, and an automatically operating slack take-up coöperative with the truck frame and the endless drive cable or rope.

3. The combination with a wheeled truck frame that includes longitudinal timbers and transverse bars; of a revolving rack mechanism that includes a vertically disposed rotary shaft, bearings therefor mounted on the said frame, a platform, the said rack mechanism also including a head, arms attached to and radially projected from the head, a bottom mounted on the arms, an annular vertical frame mounted on the said arms, and a power transmission for imparting rotary motion to the head, said transmission including an endless cable or rope drive that takes around the outer ends of the radial arms, a driven pulley on one of the rear wheels of the truck and guides upon the said truck over which the said endless rope drive passes, said drive engaging the driving pulley on the rear wheel as stated, and a clutch device that holds the driving pulley to the said rear wheels.

4. In a revolving rack mechanism of the character described and which includes a rear truck wheel, a revolving head, an endless rope power transmission for revolving the said head, and a driver pulley with which the said power transmission rope engages; of a means for clutching the driver pulley to turn with the aforesaid rear wheel at times, said clutch mechanism comprising a pair of hub disks having attached means for securing them to the spokes of the aforesaid rear wheel, a rope sheave loosely rotatable on the said hub disks and a clutch connection mounted on one of the hub disks arranged for interlockably engaging the said hub disks and interlocking the said disks and the rope sheave.

5. In a revolving rack mechanism of the character described and which includes a rear truck wheel, a revolving head, an endless rope power transmission for revolving the said head, and a driver pulley with which the said power transmission rope engages; of a means for clutching the driver pulley to turn with the aforesaid rear wheel at times, said clutch mechanism comprising a pair of hub disks having attached means for securing them to the spokes of the aforesaid rear wheel, a rope sheave loosely rotatable on the said hub disk and a clutch connection mounted on one of the hub disks arranged for interlockably engaging the said hub disks and interlocking the said disks and the rope sheave, said clutch connection including a latch bolt, a spring that tends to normally move the bolt to lock the rope sheave in the operative position and other means for holding the said bolt against its spring tension and to the released position, whereby to allow the rope sheave to run free on the hub disks.

6. In a revolving rack mechanism of the character described and which includes a rear truck wheel, a revolving head, an endless rope power transmission for revolving the said head, and a driver pulley with which the said power transmission rope engages; of a means for clutching the driver pulley to turn with the aforesaid rear wheel at times, said clutch mechanism comprising a pair of hub disks having attached means for securing them to the spokes of the aforesaid rear wheel, a rope sheave loosely rotatable on the said hub disks and a clutch connection mounted on one of the hub disks arranged for interlockably engaging the said hub disks and interlocking the said disks and the rope sheave, said clutch connection including a latch bolt, a spring that tends to normally move the bolt to lock the rope sheave in the operative position and other means for holding the said bolt against its spring tension and to the released position, whereby to allow the rope sheave to run free on the hub disks, and means coöperative with the hub disks and the wheel hub for holding the said hub disks spaced from the wheel hub.

7. The combination with a wheeled truck, said truck including longitudinal timbers and transverse bars; of a revolving rack mechanism that includes a vertically disposed rotary shaft supported between the said transverse bars, a platform fixedly mounted upon the said bars, the revolving rack also including a head, the platform having an annular trackway, horizontal arms attached to and which radiate from the said rack head, a platform and a circular rim closure on the said arms, a rope drive including a driving pulley attached to one of the rear truck wheels, an endless rope or cable that takes over the said drive pulley, guides on the truck frame over which the rope or cable passes, and guides on the outer ends of the radial arms with which the rope drive engages.

COLUMBUS JONES.

Copies of this patent may be obtained for five cents each, by addressing the "Commissioner of Patents, Washington, D. C."